(12) United States Patent
Kumar et al.

(10) Patent No.: US 10,284,390 B2
(45) Date of Patent: May 7, 2019

(54) TECHNIQUES FOR EFFICIENT SERVICE CHAIN ANALYTICS

(71) Applicant: CISCO TECHNOLOGY, INC., San Jose, CA (US)

(72) Inventors: Surendra M. Kumar, San Ramon, CA (US); Alessandro Duminuco, Milan (IT); Hendrikus G. P. Bosch, Aalsmeer (NL); Humberto J. La Roche, Ocean, NJ (US); Jeffrey Napper, Delft (NL); Burjiz Pithawala, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 121 days.

(21) Appl. No.: 15/177,021

(22) Filed: Jun. 8, 2016

(65) Prior Publication Data

US 2017/0359252 A1    Dec. 14, 2017

(51) Int. Cl.
| | |
|---|---|
| H04L 12/46 | (2006.01) |
| H04L 29/06 | (2006.01) |
| H04L 12/70 | (2013.01) |
| H04L 29/12 | (2006.01) |
| H04L 12/725 | (2013.01) |
| H04L 12/715 | (2013.01) |

(52) U.S. Cl.
CPC ........ *H04L 12/4633* (2013.01); *H04L 45/306* (2013.01); *H04L 45/64* (2013.01); *H04L 61/2503* (2013.01); *H04L 63/00* (2013.01); *H04L 69/22* (2013.01); *H04L 2012/5625* (2013.01)

(58) Field of Classification Search
None
See application file for complete search history.

(56) References Cited

U.S. PATENT DOCUMENTS

| | | |
|---|---|---|
| 2015/0319081 A1 | 11/2015 | Kasturi et al. |
| 2015/0358850 A1 | 12/2015 | La Roche et al. |
| 2015/0365322 A1 | 12/2015 | Shatzkamer et al. |

(Continued)

OTHER PUBLICATIONS

Quinn, P., et al., "Network Service Header," Internet Draft, Network Working Group, Feb. 24, 2015, 43 pages.

(Continued)

*Primary Examiner* — Christine T Duong
(74) *Attorney, Agent, or Firm* — Patterson + Sheridan, LLP

(57) ABSTRACT

A method is provided in one example embodiment and includes receiving at a network element an encapsulated packet including an encapsulation header, in which the encapsulation header includes an Analytics Proxy Function ("APF") flag; determining whether the APF flag is set to a first value; if the APF flag is set to the first value, forwarding the encapsulated packet to a local APF instance associated with the network element, in which the encapsulated packet is processed by the local APF instance to replicate at least a portion of the encapsulated packet, construct a record of the encapsulated packet, or both; and if the APF flag is not set to the first value, omitting forwarding the encapsulated packet to the local APF instance associated with the network element. The local APF instance is implemented as a service function anchored at the forwarding element.

20 Claims, 9 Drawing Sheets

(56) References Cited

U.S. PATENT DOCUMENTS

2016/0028640 A1* 1/2016 Zhang .................. H04L 45/306
                                                            370/389
2016/0330111 A1* 11/2016 Manghirmalani .... H04L 43/028
2017/0251065 A1* 8/2017 Furr ........................ H04L 67/16

OTHER PUBLICATIONS

Halpern et al., "Service Function Chaining (SFC) Architecture," Internet Engineering Task Force (IETF), RFC 7665, Oct. 2015, 32 pages.

* cited by examiner

TECHNIQUES FOR EFFICIENT SERVICE CHAIN ANALYTICS

TECHNICAL FIELD

This disclosure relates in general to the field of communications networks and, more particularly, to a technique for conducting efficient service chain analysis in such communications networks.

BACKGROUND

The delivery of end-to-end services in a communications network often requires the performance of a variety of service functions. Such service functions may include, but are not limited to, firewalls and traditional IP Network Address Translators ("NATs"), as well as application-specific functions. The definition and instantiation of an ordered set of service functions and the subsequent steering of traffic through those functions is referred to as service function chaining ("SFC"), or simply service chaining. In the process, the traffic is serviced as per policy in the service functions and the service chaining infrastructure. Within a service chaining infrastructure, analytics are performed by way of techniques available in infrastructure switches, such as traffic replication at the port level (commonly referred to as port mirroring). Another technique for performing analytics is to capture traffic details at flow granularity (commonly referred to as NetFlow). In the latter case, filters are used to select flows of interest. In all such techniques, a monitoring, or analytics, node is the destination for the replicated traffic or traffic records. These techniques are highly inefficient and add sufficient overhead when deployed in a service chaining infrastructure. Not only is the granularity of traffic replicated too coarse, in the case of port mirroring, it also does not align with the service chains of interest to be mirrored. The consequence of this is increased overhead at both ends of the replication: copying unnecessary traffic in the infrastructure and processing/analyzing same at the other end. Although filtering rules used in NetFlow may be extended to match the service chain boundaries, it is very limited to address the end-to-end view necessary in service chaining architectures for meaningful analytics to aid Operations, Administration, Management ("OAM") functions. Moreover, it requires classification to be performed at every point NetFlow is active.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1A:
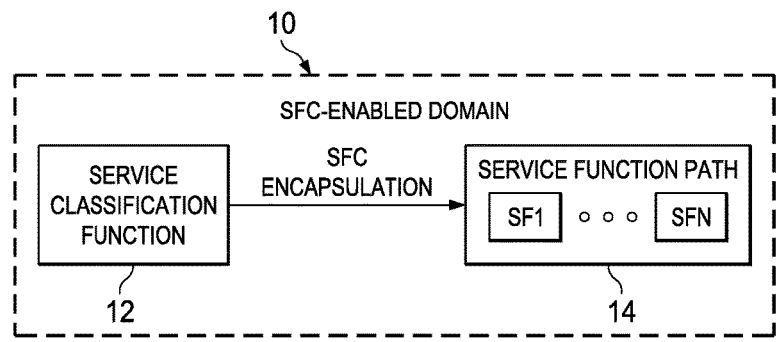
FIG. 1A is an SFC-enabled domain, which may include an initial classification function as an entry point into a service function path, in accordance with embodiments described herein.

A method is provided in one example embodiment and includes receiving at a network element an encapsulated packet including an encapsulation header, in which the encapsulation header includes an Analytics Proxy Function ("APF") flag; determining whether the APF flag is set to a first value; if the APF flag is set to the first value, forwarding the encapsulated packet to a local APF instance associated with the network element, in which the encapsulated packet is processed by the local APF instance to replicate at least a portion of the encapsulated packet, construct a record of the encapsulated packet, or both; and if the APF flag is not set to the first value, omitting forwarding the encapsulated packet to the local APF instance associated with the network element. The local APF instance is implemented as a service function anchored at the forwarding element.

Example Embodiments

To accommodate agile networking and flexible provisioning of network nodes in a network, service chaining may be used to ensure an ordered set of service functions are applied to packets and/or frames of a traffic flow. Service chaining provides a method for deploying service functions in a manner that enables dynamic ordering and topological independence of the service functions. A service chain may define an ordered set of service functions to be applied to packets and/or frames of a traffic flow, wherein a particular service chain is selected as a result of classification. The implied order may not be a linear progression, as the architecture may allow for nodes that copy to more than one branch.

Service chaining involves a classifier function that performs classification based on policies configured by a control plane element to select a service chain to process traffic and load balances the traffic among instances of the selected service chain. Once the classifier function selects a service chain instance (a.k.a. service function path or "SFP"), it forwards the traffic along a service function path ("SFP"), or simply, a service path, through one or more service-aware forwarding elements ("FEs"). In one certain embodiment, each forwarding element implements a service function forwarder ("SFF") capability described in an IETF draft entitled "Service Function Chaining (SFC) Architecture" (IETF RFC7665—https://datatracker.ietf.org/doc/rfc7665/) (hereinafter "SFC Architecture RFC"). The forwarding elements forward the traffic to the actual service functions that are logically anchored to, and/or instantiated on, the forwarding element. Forwarding of traffic between any two components in such an architecture, and hence along the service chains, is performed over an overlay network. Overlay networks are realized via a transport header and an encapsulation header. Various network encapsulation headers have been employed to forward traffic, requiring service through the service chains. Such network encapsulation headers encapsulate the original packet, or frame, and are themselves encapsulated in an overlay transport protocol. Examples of encapsulation headers include proprietary headers, such as vPath, or proposed IETF standard headers, such as Network Service Header ("NSH"). Transport protocols used to carry such encapsulated packets may be L3- or L4-based, such as IPv4/IPv6 or GRE or UDP, VxLAN, etc. In the case of vPath, even L2-based, such as LLC SNAP.

FIG. 1A illustrates an SFC-enabled domain 10, which may include an initial service classification function (or "classifier") 12, as an entry point to a service path. The initial service classification function 12 prescribes an instance of the service path, designated in FIG. 1A by a reference numeral 14, and encapsulates a packet or frame with service path information that identifies the service path. The classification function 12 may potentially add metadata, or shared context to the SFC encapsulation part of the packet or frame. The service path 14 may include a plurality of service functions, designated in FIG. 1A by SF1, SF2, . . . SFN.

A service function may be responsible for specific treatment and/or processing of received packets. A service function may act at the network layer or other OSI layers (e.g., application layer, presentation layer, session layer, transport layer, data link layer, and physical link layer). A service function may be a virtual instance or be embedded in a physical network element, such as a service node. When a service function or other modules of a service node are executed by the at least one processor of the service node, the service function or other modules may be configured to implement any one of the methods described herein. Multiple service functions can be embedded in the same network element. Multiple instances of the service function can be enabled in the same administrative SFC-enabled domain. A non-exhaustive list of service functions includes firewalls, WAN and application acceleration, Deep Packet Inspection ("DPI"), server load balancers, NAT44, NAT64, HOST_ID injection, HTTP Header Enrichment functions, TCP optimizer, and others. A service function may be SFC-encapsulation aware; that is, it may receive and act on information in the SFC encapsulation, or unaware in which case data forwarded to the service does not contain the SFC encapsulation.

A service node may be a physical network element (or a virtual element embedded on a physical network element) that hosts one or more service functions and may have one or more network locators associated with it for reachability and service delivery. In many standardization documents, "service functions" can refer to the service nodes described herein as having one or more service functions hosted thereon. SFP, or simply service path, relates to the instantiation of a service chain in a network. Packets follow a service path from a classifier through the requisite service functions.

Figure 1B:
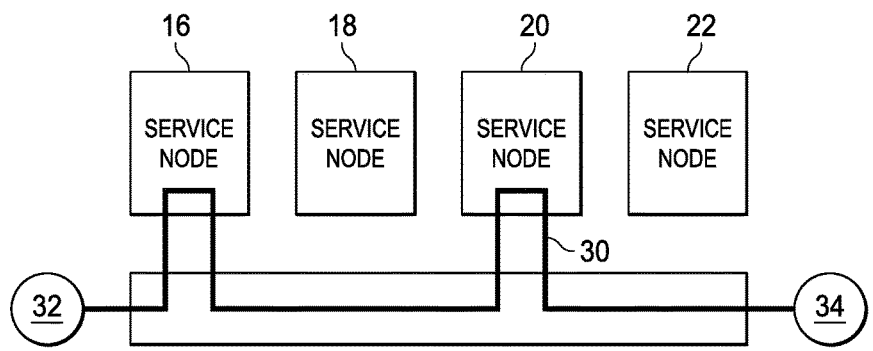
FIG. 1B illustrates a simplified block diagram of a service function chain, which may include an initial classification function as an entry point into a service function path, in accordance with embodiments described herein.
Figure 1C:
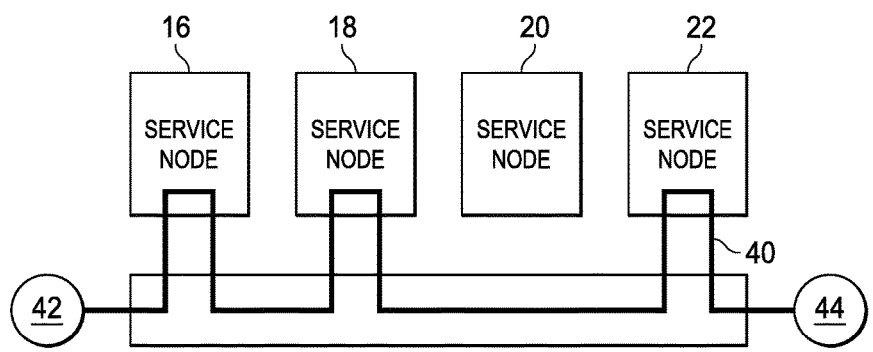
FIG. 1C illustrates a simplified block diagram of another service function chain, which may include an initial classification function as an entry point into a service function path, in accordance with embodiments described herein.

FIGS. 1B-1C illustrate different service paths that may be realized using service function chaining. These service paths may be implemented by encapsulating packets of a traffic flow with a network service header ("NSH") or some other suitable packet header which specifies a desired service path (e.g., by identifying a particular service path using service path information in the NSH) through one or more of service nodes 16, 18, 20, and 22. In the example shown in FIG. 1B, a service path 30 may be provided between an endpoint 32 and an endpoint 34 through service node 16 and service node 20. In the example shown in FIG. 1C, a service path 40 (a different instantiation) can be provided between end point 42 and endpoint 44 through service node 16, service node 18, and service node 22.

Generally speaking, an NSH includes service path information, and NSH is added to a packet or frame. For instance, an NSH can include a data plane header added to packets or frames. Effectively, the NSH creates a service plane. The NSH includes information for service chaining, and in some cases, the NSH can include metadata added and/or consumed by service nodes or service functions. The packets and NSH are encapsulated in an outer header for transport. To implement a service path, a network element such as a service classifier ("SCL") or some other suitable SFC-aware network element can process packets or frames of a traffic flow and performs NSH encapsulation according to a desired policy for the traffic flow.

Figure 2A:
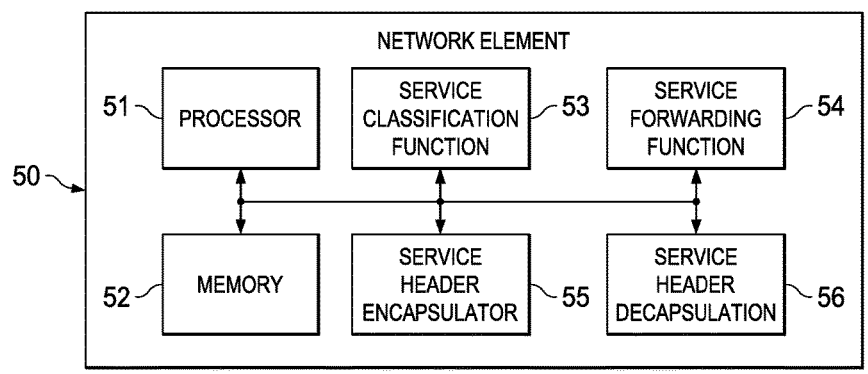
FIG. 2A is a simplified block diagram of a first type of service function chain-aware network element for performing efficient service chain analysis of a traffic flow in accordance with embodiments described herein.

FIG. 2A shows a system view of SFC-aware network element 50, e.g., such as an initial service classifier, for prescribing a service path of a traffic flow, according to some embodiments of the disclosure. Network element 50 includes processor 51 and (computer-readable non-transitory) memory 52 for storing data and instructions. Furthermore, network element 50 may include a service classification function 53, a service forwarding function 54, a service header encapsulator 55, and a service header decapsulator 56, all of which may be provided by processor 51 when processor 51 executes the instructions stored in memory 52. Service forwarding function 54 determines how to forward service encapsulated packets at a classifier or a forwarding network element. It also determines whether to remove or modify the service encapsulation header received. The latter is true if the network element is acting as a service forwarder as opposed to a classifier. In general, a classifier needs a service forwarding function alongside it, whereas a service forwarding function does not necessarily need a classifier.

The service classification function 53 can process a packet of a traffic flow and determine whether the packet requires servicing and correspondingly which service path to follow to apply the appropriate service. The determination can be performed based on business policies and/or rules stored in memory 52. Once the determination of the service path is made, service header encapsulator 55 generates an appropriate NSH having identification information for the service path and adds the NSH to the packet. The service header encapsulator 55 provides an outer encapsulation to forward the packet to the start of the service path. Other SFC-aware network elements are thus able to process the NSH while other non-SFC-aware network elements would simply forward the encapsulated packets as is. Besides inserting an NSH, network element 50 can also remove or not add the NSH if the service classification function 53 determines the packet does not require servicing.

Figure 2B:
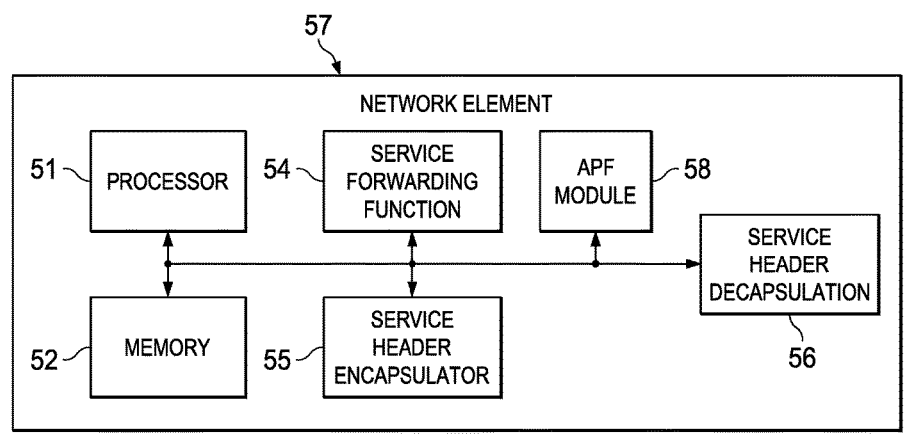
FIG. 2B is a simplified block diagram of a second type of service chain function-aware network element for performing efficient service chain analysis of a traffic flow in accordance with embodiments described herein.

FIG. 2B shows a system view of an SFC-aware network element 57, e.g., such as a forwarding element or SFF, for forwarding service flows to service functions and to other SFFs as prescribed, according to some embodiments of the disclosure. Network element 57 is identical in all respects to network element 50 except that network element 57 includes an APF module 58, for purposes that will be described in detail below, and does not include service classification function 53.

An NSH may include a (e.g., 64-bit) base header, and one or more context headers. Generally speaking, the base header provides information about the service header and service path identification ("SPI"), and context headers may carry opaque metadata (such as the metadata described herein reflecting the result of classification). For instance, an NSH can include a 4-byte base header, a 4-byte service path header, and optional context headers. The base header can provide information about the service header and the payload protocol. The service path header can provide path identification and location (i.e., service function) within a path. The variable length context headers can carry opaque metadata and variable length encoded information. The one or more optional context headers make up a context header section in the NSH. For instance, the context header section can include one or more context header fields having pieces of information therein, describing the packet/frame. Based on the information in the base header, a service function of a service node can, for instance, derive policy selection from the NSH. Context headers shared in the NSH can, for instance, provide a range of service-relevant information such as traffic classification, end point identification, etc. Service functions can use NSH to select local service policy.

It will be recognized that classification may also occur at the SFC-aware network element 57 as well, resulting in a different service path. In such an embodiment, the network element 57 may also include a Service Classification Function (not shown in FIG. 2B) for performing classification for service chaining (as opposed to detecting whether the packet is of interest to the analytics system, which is a distinct type of classification).

Figure 3:
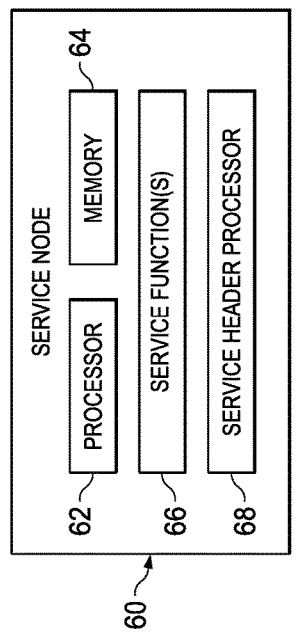
FIG. 3 is a simplified block diagram of a service node in accordance with embodiments described herein.

Once properly classified and encapsulated by the classifier, the packet having the NSH may be then forwarded to one or more service nodes where service(s) can be applied to the packet/frame. FIG. 3 shows a system view of a service node, according to some embodiments of the disclosure. Service node 60, generally a network element, can include processor 62 and (computer-readable non-transitory) memory 64 for storing data and instructions. Furthermore, service node 60 may include service function(s) 66 (e.g., for applying service(s) to the packet/frame, classifying the packet/frame) and service header processor 68. The service functions(s) 66 and service header processor 68 can be provided by processor 62 when processor 62 executes the instructions stored in memory 64. Service header processor 68 can extract the NSH, and in some cases, update the NSH as needed. For instance, the service header processor 68 can decrement the service index. If the resulting service index=0, the packet is dropped. In another instance, the service header processor 68 or some other suitable module provide by the service node can update context header fields if new/updated context is available. In certain situations, the service node does not understand the NSH and is said to be "NSH unaware." In these situations, the NSH is stripped by the SFF before the packet is delivered to the service node.

As previously noted, service chaining involves a classifier function performing classification based on policies configured by a control plane to select service chains and perform load balancing among instances of the service chains. The classifier function then forwards the traffic along the SFP through one or more service-aware forwarding elements. Forwarding elements implement a service function forwarder ("SFF") capability described in the aforementioned SFC Architecture IETF Draft. The forwarding elements forward the traffic to the actual service chain nodes that are logically anchored to the forwarding element. Forwarding of traffic between any two components in such an architecture, and hence through the service chains, is performed over an overlay network. As previously noted, overlay networks are realized via a transport header and an encapsulation header. Various network encapsulation headers have been employed to forward traffic, requiring service through the service chains. Such headers encapsulate the original packet, or frame, and are themselves encapsulated in an overlay transport protocol. Examples of encapsulation headers include proprietary headers such as vPath or proposed IETF standard headers, such as Network Service Header ("NSH"). The transport protocols used to carry such encapsulations are typically L3 or L4 based, such as IPv4/IPv6 or GRE or UDP, VxLAN, etc. In the case of vPath, even L2 protocols, such as LLC SNAP, may be used.

By way of an example, a service chain $SC_1$ may be described in terms of service function ("SF") types:

$$SC_1 = SF_a, SF_b, SF_c$$

Corresponding service chain instances, i.e., the service paths ("SPs"), may be constructed from instances of the service function type:

$$SP_{1.1} = SF_{a1}, SF_{b1}, SF_{c1}$$

$$SP_{1.2} = SF_{a1}, SF_{b2}, SF_{c2}$$

Figure 4:
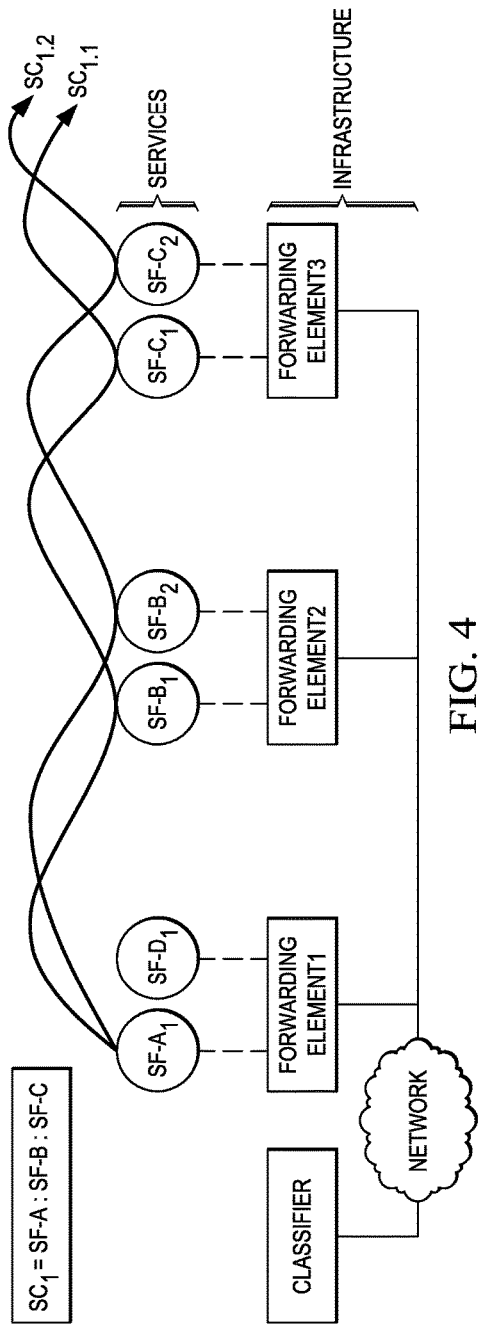
FIG. 4 illustrates two example service paths in accordance with embodiments described herein.
Figure 5:
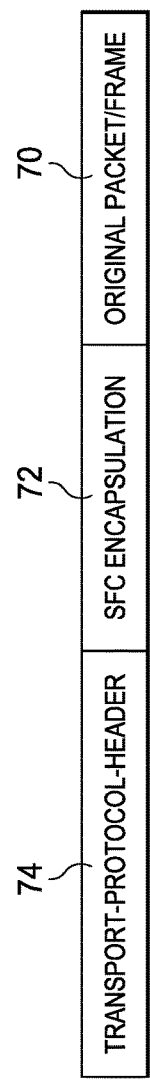
FIG. 5 illustrates an example packet structure in accordance with embodiments described herein.

As illustrated in FIG. 4, service chain SC1 maps to two service paths SP1.1 and SP1.2. Classifier selects the service chain SC1 and load balances between instances SP1.1 and SP1.2. In general, packets forwarded between the components, such as, between classifier and forwarding element or forwarding element and service function, is of the form illustrated in FIG. 5 and include an original packet/frame 70, SFC encapsulation 72, and a transport protocol header 74. The SFC encapsulation 72 may be implemented using an NSH. As previously noted, NSH includes a base header, a service header, and a fixed/variable number of metadata TLVs as described in IETF draft entitled "Network Service Header" (draft-ietf-sfc-nsh-01.txt) (hereinafter "NSH IETF Draft").

Figure 6:
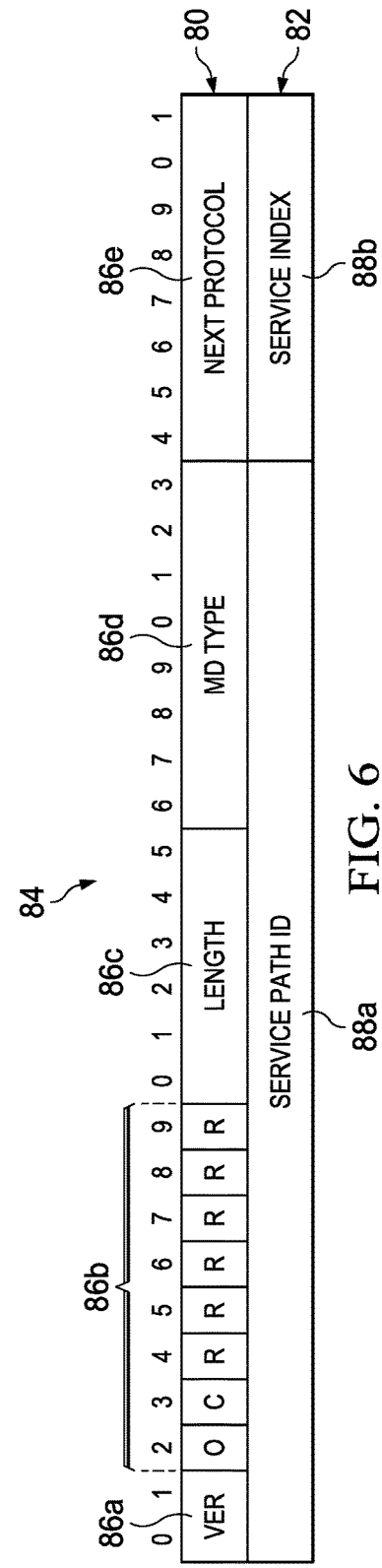
FIG. 6 illustrates an example arrangement of base and service headers in accordance with embodiments described herein.

FIG. 6 shows the format of a base header 80 and a service header 82 of a conventional NSH 84. As shown in FIG. 6, the base header 80 includes a version field 86a, a number of individual bits/flags, collectively designated by a reference numeral 86b, a length field 86c, a metadata type field 86d, and a next protocol field 86e. The services header 82 includes a Service Path ID field 88a and a Service Index field 88b. The fields and their contents are described in detail in the aforementioned NSH IETF Draft. In some cases, NSH requires that the Service Index ("SI") must be decremented by the service functions. Also, in some cases, NSH requires that the FEs must forward NSH encapsulated traffic based Service Path ID ("SPI") and Service Index ("SI"), as received from other components. As described above, both the SPI and the SI, which are included in the service header of an NSH, are needed to make a forwarding decision. The control plane constructs the SPIs and distributes them into the forwarding elements along with SI and decrement value (i.e., the amount by which to decrement the SI).

In accordance with features of embodiments described herein, a special type of service function, referred to as an Analytics Proxy Function ("APF"), is defined. In certain embodiments, APF is defined in the same manner as any other service function and has many attributes, including the destination for the replicated/captured traffic, the type of encapsulation to be used to send the traffic to the destination, capabilities, etc. APF is included in a service chain in the same manner as other service functions and may be included multiple times in defining a service chain. Each appearance of the APF in a chain may have a sub-type associated with it to allow for mapping to different APF instances while constructing the corresponding service paths. APFs are implemented in the forwarding elements (or service functions that are in the service path). Each appearance of an APF consumes one service index, the same as any service function. This allows for explicitly specifying the position(s) of the APF in the service chain.

As previously noted, APF may optionally be implemented in forwarding elements. The forwarding elements are optimized to perform packet replication and record construction and may optionally employ hardware to achieve that. Alternatively, the APF may be implemented as service functions anchored at a forwarding element. In either case, the APF constructs replicated packets or traffic records based on a subset of the content from the original packet, e.g., L2+L3 header only or L3 header+payload. The APF performs the above action only when it sees special flags in the NSH packet (as described below); otherwise, it remains dormant. When dormant, the APF is transparent to traffic and performs as a pass-through function with near zero processing overhead. When the APF becomes active, It does not affect the original packet in any way and permits the original traffic to pass through after the necessary content is replicated or records constructed.

The classifier uses special signaling flags to turn the dormant APFs into active functions. The classifier allows for policies to be configured by the control plane to control the APF behavior. As will be described in detail below with reference to FIG. 7A, the classifier uses bits in the NSH header to activate APFs along the service path, as well as to define additional behavior. When the A bit, or flag, is set to 1, all of the APFs on the service path as indicated by the Service Path ID are activated.

Figure 7A:
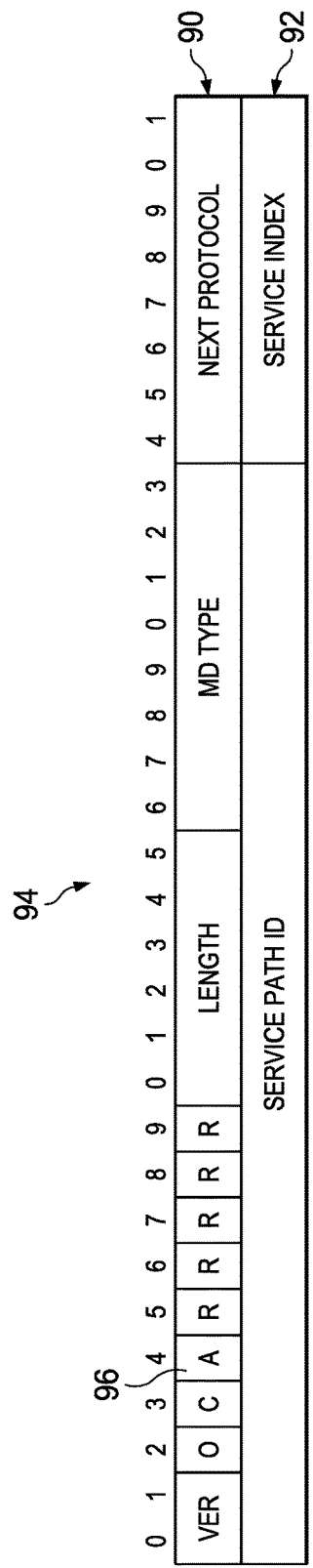
FIG. 7A illustrates a revised arrangement of base and service headers in accordance with embodiments described herein.

FIG. 7A shows the format of a base header 90 and a service header 92 of a modified NSH 94 for implementing features of embodiments described herein. As shown in FIG. 7A, one of the bits/flags of the base header 90 (designated in FIG. 7A by a reference numeral 96) is identified as an APF Activation, or "A," bit or flag. In operation, as will be described in greater detail below, when the A bit 96 is set to 1, all APFs on the service path indicated by an SPI 98 of the service header 92 are activated. Conversely, when the A bit 96 is set to 0, the APFs on the service path indicated by the SPI 98 are inactivated.

Figure 7B:
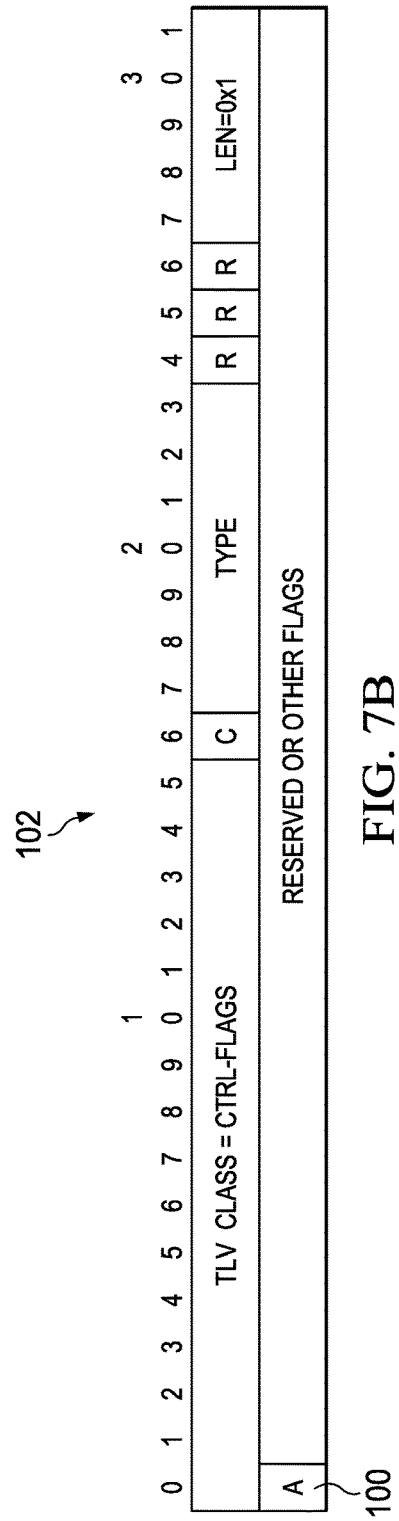
FIG. 7B illustrates an NSH variable context header TLV arranged in accordance with embodiments described herein.
Figure 7C:
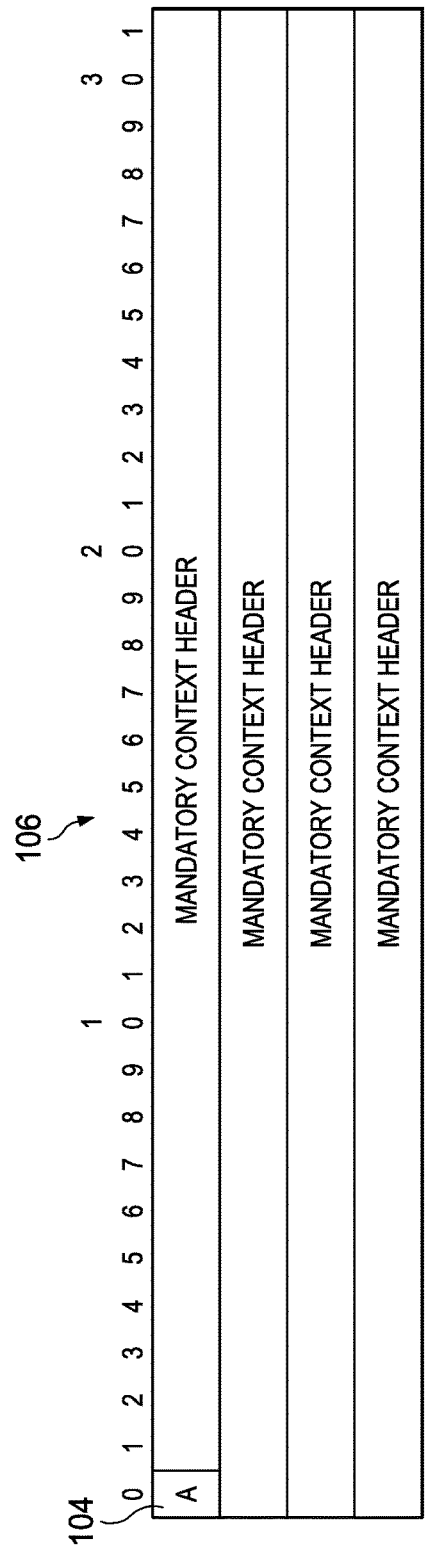
FIG. 7C illustrates an NSH mandatory context header arranged in accordance with embodiments described herein.

As an alternative or in addition to implementing a static APF policy dictating what portions of packet to replicate, for example, as shown in FIG. 7B, activation can be signaled via the NSH context headers through the definition of an equivalent A flag 100 in a fixed length context header 102 and APF policy can be defined via one or more bits in the fixed length context header 102. Alternatively, as illustrated in FIG. 7C, activation can be signaled via the NSH context headers through the definition of an equivalent A flag 104 via TLVs of a variable length context header 106 and APF policy can be defined via one or more TOVs of the variable length context header 106. Even when the encapsulation is something other than NSH, a few bits in such an encapsulation for use by the techniques described herein are sufficient to support this mechanism.

Continuing with the example set forth above, $SC_1$ may be augmented to include APFs ($SC_2$):

$$SC_2 = SF_a, APF_X, SF_b, SF_c, APF_X$$

Corresponding service chain instances, i.e., the service paths ("SPs"), may be constructed from instances of the service function type:

$$SP_{2.1} = SF_{a1}, APF_{X1}, SF_{b1}, SF_{c1}, APF_{X1}$$

$$SP_{2.2} = SF_{a1}, APF_{X2}, SF_{b2}, SF_{c2}, APF_{X2}$$

As shown in the above-example, the two service paths $SP_{2.1}$ and $SP_{2.2}$ use different analytics node instances (1 & 2) of the same type (x) as indicated by the subscripts. Specifically, $SP_{2.1}$ uses $APF_{X1}$ and $SP_{2.2}$ uses $APF_{X2}$. $SP_{2.1}$ uses $APF_{X1}$ and $SP_{2.2}$ uses $APF_{X2}$. For example, $APF_{X1}$ and $APF_{X2}$ may point to different destinations to which to send the traffic. Alternatively, they may point to the same destination and have different attributes on how they process traffic. The control plane constructs the service paths with different instances of APF based on policy.

Figure 8:
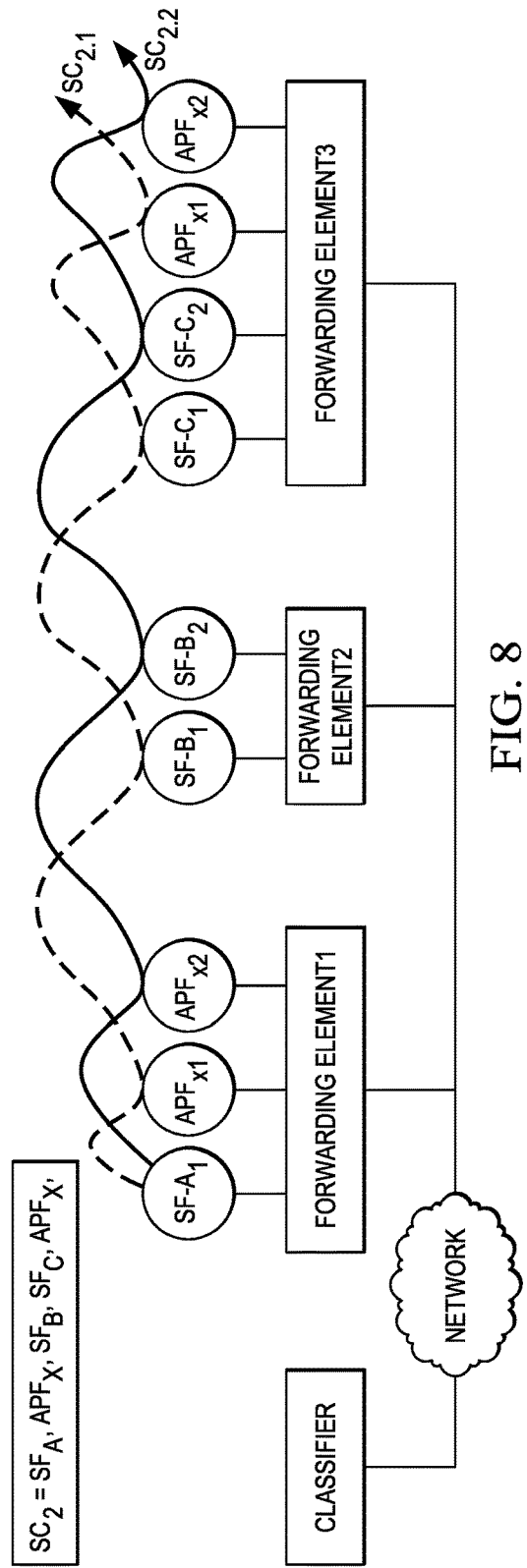
FIG. 8 illustrates two example service paths including Analytics Proxy Function ("APF") service functions in accordance with embodiments described herein.

As illustrated in FIG. 8, service chain SC2 maps to two service paths SP2.1 and SP2.2. Classifier selects the service chain SC2 and load balances between instances SP2.1 and SP2.2.

It will be noted that the construction of service chains that include one or more APFs as service functions proceeds the same as construction of normal service chains. The position of each APF service function in the service chain dictates where along the service function "path" the APF function is located and hence where/when the replication function is performed. Once the APF service function performs the replication on all or a portion of the packet as dictated by policy at the classifier or as specified in the NSH itself (e.g., as shown in FIGS. 7B and 7C), the replicated data is forwarded to the analytics engine identified by the attributes of the particular APF. Service chains may be constructed with multiple instances of APF service functions of the same or different type within the same service chain.

Figure 9:
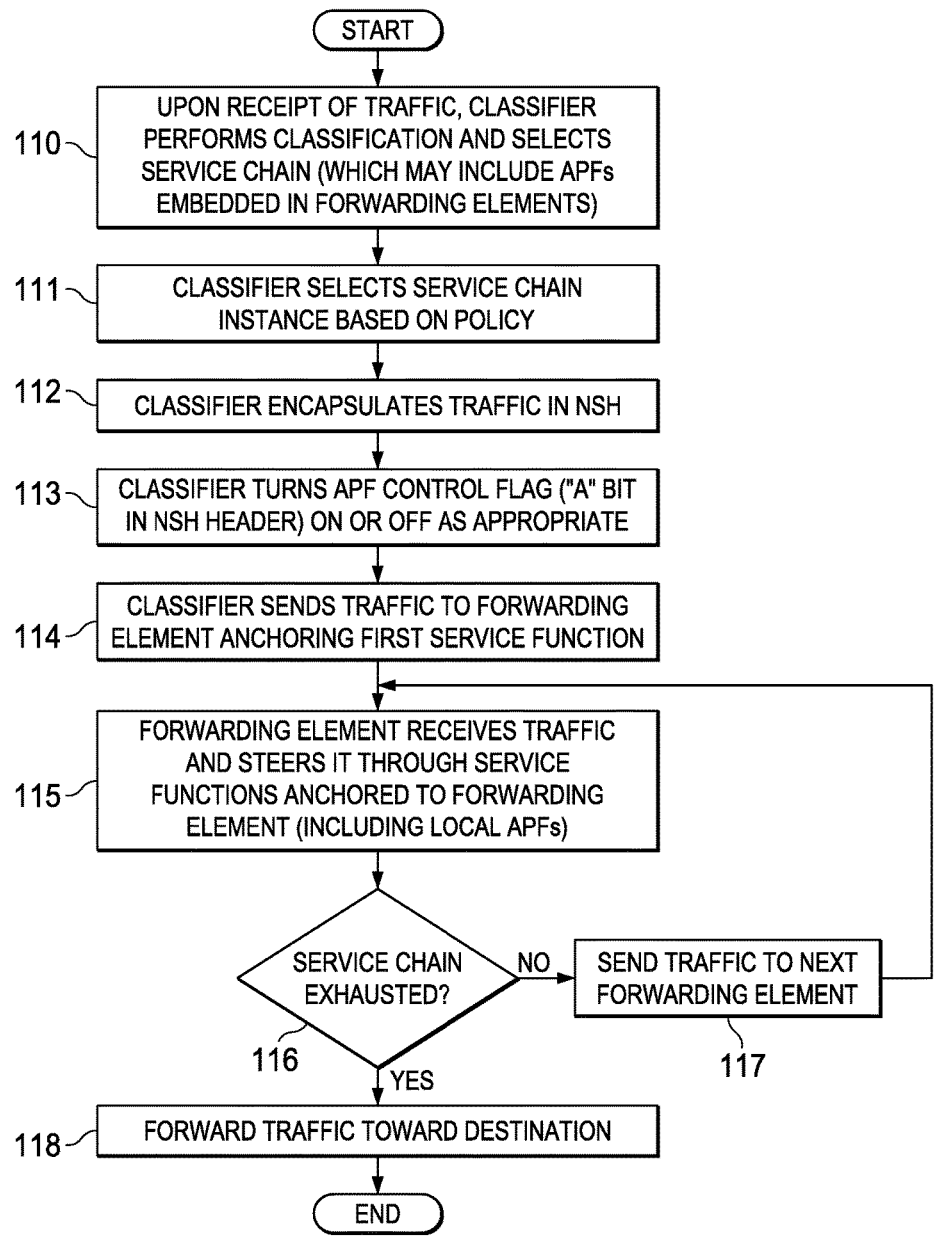
FIG. 9 illustrates a flowchart showing a method that may be implemented at a network element, such as the network element of FIG. 2B, in accordance with embodiments described herein for performing efficient service chain analysis of a traffic flow.

Referring now to FIG. 9, in operation, in step 110, the classifier receives traffic, performs classification, and selects a service chain as dictated by policy. It will be assumed for the sake of example herein that the classifier selects SC2. In step 111, the classifier, based on policy determines the appropriate service chain instance to use. It will be assumed for the sake of example herein that the classifier selects instance SP21. In step 112, the classifier encapsulates the traffic in NSH. In step 113, the classifier sets the APF flag to the appropriate value (A=0 to turn APF functionality OFF and A=1 to turn APF functionality ON) as dictated by policy for the particular flow. It will be noted that the setting of the APF flag in the encapsulation (e.g., NSH) header is based on classification performed by the classifier. Additionally, the APF flag may be set of a specific subset of packets, a specific subset of flows, during certain time periods, for specific users/subscribers, for specific applications, and/or a combination of these. The classifier may support any policy for setting the A flag. In step 114, the classifier sends the traffic to the forwarding element anchoring the first service function. In the example illustrated in FIG. 4, the classifier sends the traffic to forwarding element 1. In step 115, the forwarding element receiving the NSH encapsulated traffic steers it through service functions anchored to that forwarding element. When servicing is complete, execution proceeds to step 116, in which a determination is made whether the service chain has been exhausted. If negative determination is made in step 116, execution proceeds to step 117, in which the forwarding element sends the traffic to the forwarding element hosting the next service function on the chain, and then returns to step 115. If a positive determination is made in step 116, execution proceeds to step 118, in which the traffic is forwarded toward its destination. As part of steering, the forwarding element recognizes the special APFs and steers it through the "local" APF embedded in or anchored to the forwarding element. In the illustrated example, traffic is run through APF modules on forwarding element FE1 and forwarding element FE3.

In the operations described above, the APF bit in NSH is turned on by the classifier based on policy. This policy may dictate the flag to be turned on for a specific service chain or a set of service chains. Further, the policy may indicate to turn the APF flag ON for a specific group of flows within a service chain or even as subset of packets within those flows. The policy may even be time-based or some combination of the foregoing to enable the APF flag for a certain duration for a certain type of traffic or certain user traffic. In other words, the policy fully controls the granularity of the traffic. For example, the APF flag may be turned on for a specific subscriber or on a specific chain or for a specific type of flow across all service chains. As yet another example, APF flag can be turned for a specific subscriber on a specific chain for a specific type of flow and for a subset of packets on that flow and further only during a certain time periods of the day.

Similarly, additional flags in NSH can be used to control what part of the traffic is replicated toward the analytics nodes by the AFP on the forwarding nodes. The mechanism is extensible in how the content is replicated. For example, an additional flag (or flags) in the NSH may signal the APFs to copy only the L2, L3, and L4 headers of the original packet and not the whole packet. Alternately, the APFs may be statically programmed with a comprehensive policy that determines what parts of traffic to copy towards the analytics nodes. As an example, the policy may indicate to make a copy of packets only if a certain condition is met, such as cumulative byte count exceeding a certain threshold or upon seeing a certain signature in the traffic. In implementations in which the classifier offloads residual packets of a flow or user, the classifier will not be in the path of the traffic to turn the APF flags ON/OFF for those packets. In those instances, the APF flags can be cached along with the offloaded flows and hence continue to function on the flow/user boundary.

Certain embodiments comprise a method to replicate traffic (or summary records) along a full length of a service chains. Such replication may be enabled dynamically without altering the service chain configuration and only through the use of flags in NSH (or any other encapsulation). Embodiments further enable such replication to be achieved at various granularities without additional classification overhead along the service path.

Embodiments described herein enable a variety of advantages, including supporting traffic replication (or summary records) on service chain boundaries as well as various granularities within, including packet and flow, providing traffic replication along the full length of a service chain, and allowing dynamic enablement of traffic replication along the service path. Additionally, embodiments are fully controlled by policy in the classifier and enable replication along the service chain (path) with no additional classification requirement at each of the forwarding elements as with traditional methods. Moreover, embodiments described herein limit processing overhead to only those packets, flows, and service chains that are of interest to the analytics system, avoid changes to service chains in enabling replication thereby keeping the service chains consistent, and are accomplished without any dependency on existing switching layer. Finally, certain embodiments allow for different monitoring and analyzing stations to collect and analyze traffic simultaneously, dynamically control what kind of information needs to be sent to the analytics/monitoring nodes, and provide advanced capabilities while dynamically activated through static polices at the replication points.

Figure 10:
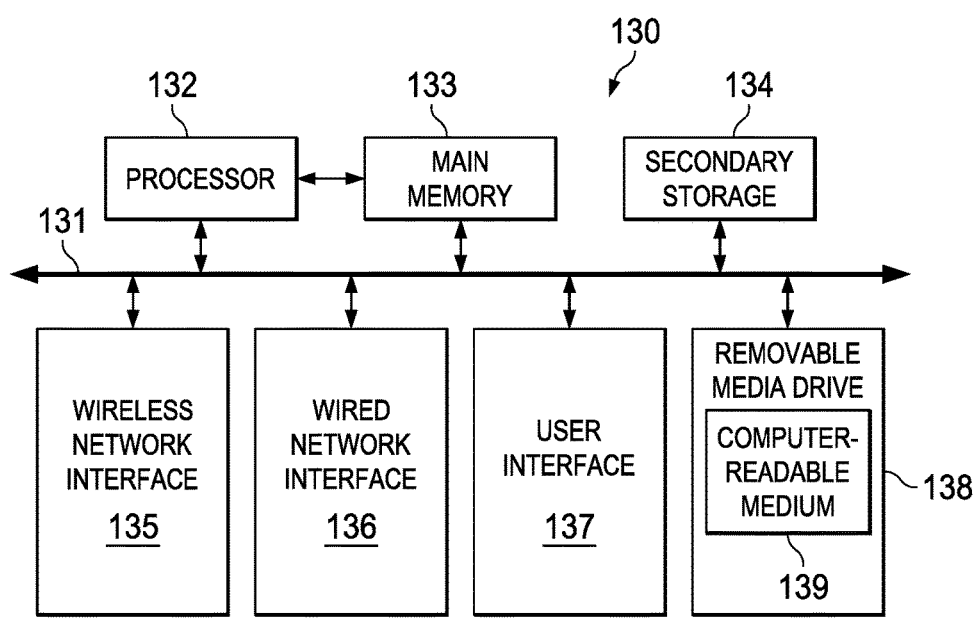
FIG. 10 is a simplified block diagram of a machine comprising an element of a communications network in which techniques for infrastructure-exclusive service forwarding in accordance with embodiments described herein may be implemented.

Turning to FIG. 10, FIG. 10 illustrates a simplified block diagram of an example machine (or apparatus) 130, which in certain embodiments may be a classifier or a forwarding element, that may be implemented in embodiments described herein. The example machine 130 corresponds to network elements and computing devices that may be deployed in a communications network, such as a classifier or a forwarding element. In particular, FIG. 10 illustrates a block diagram representation of an example form of a machine within which software and hardware cause machine 130 to perform any one or more of the activities or operations discussed herein. As shown in FIG. 10, machine 130 may include a processor 132, a main memory 133, secondary storage 134, a wireless network interface 135, a wired network interface 136, a user interface 137, and a removable media drive 138 including a computer-readable medium 139. A bus 131, such as a system bus and a memory bus, may provide electronic communication between processor 132 and the memory, drives, interfaces, and other components of machine 130.

Processor 132, which may also be referred to as a central processing unit ("CPU"), can include any general or special-purpose processor capable of executing machine readable instructions and performing operations on data as instructed by the machine readable instructions. Main memory 133 may be directly accessible to processor 132 for accessing machine instructions and may be in the form of random access memory ("RAM") or any type of dynamic storage (e.g., dynamic random access memory ("DRAM")). Secondary storage 134 can be any non-volatile memory such as a hard disk, which is capable of storing electronic data including executable software files. Externally stored electronic data may be provided to computer 130 through one or more removable media drives 138, which may be configured to receive any type of external media such as compact discs ("CDs"), digital video discs ("DVDs"), flash drives, external hard drives, etc.

Wireless and wired network interfaces 135 and 136 can be provided to enable electronic communication between machine 130 and other machines, or nodes. In one example, wireless network interface 135 could include a wireless network controller ("WNIC") with suitable transmitting and receiving components, such as transceivers, for wirelessly communicating within a network. Wired network interface 136 can enable machine 130 to physically connect to a network by a wire line such as an Ethernet cable. Both wireless and wired network interfaces 135 and 136 may be configured to facilitate communications using suitable communication protocols such as, for example, Internet Protocol Suite ("TCP/IP"). Machine 130 is shown with both wireless and wired network interfaces 135 and 136 for illustrative purposes only. While one or more wireless and hardwire interfaces may be provided in machine 130, or externally connected to machine 130, only one connection option is needed to enable connection of machine 130 to a network.

A user interface 137 may be provided in some machines to allow a user to interact with the machine 130. User interface 137 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 138 represents a drive configured to receive any type of external computer-readable media (e.g., computer-readable medium 139). Instructions embodying the activities or functions described herein may be stored on one or more external computer-readable media. Additionally, such instructions may also, or alternatively, reside at least partially within a memory element (e.g., in main memory 133 or cache memory of processor 132) of machine 130 during execution, or within a non-volatile memory element (e.g., secondary storage 134) of machine 130. Accordingly, other memory elements of machine 130 also constitute computer-readable media. Thus, "computer-readable medium" is meant to include any medium that is capable of storing instructions for execution by machine 130 that cause the machine to perform any one or more of the activities disclosed herein.

Not shown in FIG. 10 is additional hardware that may be suitably coupled to processor 132 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 130 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 130 to appropriately manage the operation of the hardware components therein.

The elements, shown and/or described with reference to machine 130, are intended for illustrative purposes and are not meant to imply architectural limitations of machines such as those utilized in accordance with the present disclosure. In addition, each machine may include more or fewer components where appropriate and based on particular needs. As used in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, classifier and forwarding elements, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 133, secondary storage 134, computer-readable medium 139) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 132) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM"), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Certain embodiments described herein separate the overlay in service function chaining into an infrastructure overlay and a service function overlay, allowing additional security policies to be enforced between the two. Certain embodiments described herein provide a stateless, hardware friendly method for decrementing the NSH service index without requiring any state at the forwarding element or sender awareness. Additionally, certain embodiments described herein restrict the forwarding decisions (in updating the service index) to the forwarding elements alone and frees the service functions to focus purely on service delivery and avoid dealing with complexities associated with forwarding decisions. Still further, certain embodiments described herein enable the service chaining control plane to scale independently of the number of service functions and prevent issues that may arise due to incorrect manipulation of the service index by limiting manipulation of the service index to forwarding elements.

Certain embodiments described herein allow snooping tools or any type of intermediate nodes to clearly determine whether the NSH encapsulated packet is going between forwarding elements or between a forwarding element and a service function without relying on the source and destination locators, which is useful in tracing and debugging, especially in cloud deployments. Certain embodiments described herein allow the service index on an NSH packet to be always associated with the service function as indicated by the service index whether the packet is in transit from a forwarding element to the service function or from the service function to a forwarding element.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving, at a forwarding network element in a pre-classified service path, an encapsulated packet including an encapsulation header, wherein the encapsulation header includes an Analytics Proxy Function ("APF") flag, wherein the APF comprises a dormant service function; and
   upon determining that the APF flag is set to a first value;
   activating a local APF instance, wherein the activated local APF is dormant prior to activation and performs as a pass-through function when dormant, and forwarding the encapsulated packet to the activated local APF instance associated with the forwarding network element, wherein the encapsulated packet is processed by the activated local APF instance to replicate at least a portion of the encapsulated packet, construct a record of the encapsulated packet, or both, wherein the activated local APF instance performs as a pass-through function after the replication, construction, or both;
   wherein the local APF instance is implemented as a service function anchored at the forwarding network element.

2. The method of claim 1, wherein the encapsulation header comprises a network services header ("NSH") including a service path header including a Service Path ID ("SPI") for identifying a service chain for the encapsulated packet and a Service Index ("SI") for identifying a service function of the identified service chain, the method further comprising:
   subsequent to the forwarding, decrementing the SI; and
   forwarding the encapsulated packet to a next service function indicated by the SI.

3. The method of claim 2, wherein the next service function indicated by the SI comprises a second local APF instance.

4. The method of claim 2, wherein the identified service chain includes a plurality of service functions and wherein at least one of the service functions included in the service chain comprises at least one APF and wherein a first local APF instance comprises an instance of the at least one APF.

5. The method of claim 4, wherein a position of each at least one APF in the identified service chain dictates where along a service function path a function associated with the at least one APF is performed.

6. The method of claim 5, wherein the at least one APF comprises a first APF and a second APF, wherein the first and second APFs may be the same or different.

7. The method of claim 1, wherein the APF flag is set to the first value based on classification of the encapsulated packet at a classifier.

8. The method of claim 7, wherein the APF flag is set to the first value by the classifier based on classification of the encapsulated packet as at least one of a member of a particular subset of packets, a member of a particular subset of flows, being sent during a particular time period, being related to a particular subscriber, and being related to a particular application.

9. The method of claim 1, wherein additional indicators are included in the encapsulation header for indicating what portion of the encapsulated packet is replicated by the local APF instance.

10. One or more non-transitory tangible media having encoded thereon logic that includes code for execution and when executed by a processor is operable to perform operations comprising:
   receiving, at a forwarding network element in a pre-classified service path, an encapsulated packet including an encapsulation header, wherein the encapsulation header includes an Analytics Proxy Function ("APF") flag, wherein the APF comprises a dormant service function;
   upon determining that the APF flag is set to a first value;
   activating a local APF instance, wherein the activated local APF is dormant prior to activation and performs as a pass-through function when dormant, and forwarding the encapsulated packet to the activated local APF instance associated with the forwarding network element, wherein the encapsulated packet is processed by the activated local APF instance to replicate at least a portion of the encapsulated packet, construct a record of the encapsulated packet, or both; wherein the local APF instance is implemented as a service function anchored at the forwarding network element, wherein the activated local APF instance performs as a pass-through function after the replication, construction, or both.

11. The media of claim 10, wherein the encapsulation header comprises a network services header ("NSH") including a service path header including a Service Path ID ("SPI") for identifying a service chain for the encapsulated packet and a Service Index ("SI") for identifying a service function of the identified service chain, the operations further comprising:
   subsequent to the forwarding, decrementing the SI; and
   forwarding the encapsulated packet to a next service function indicated by the SI.

12. The media of claim 11, wherein the next service function indicated by the SI comprises a second local APF instance.

13. The media of claim 11, wherein the identified service chain includes a plurality of service functions and wherein at least one of the service functions included in the service chain comprises at least one APF and wherein a first local APF instance comprises an instance of the at least one APF.

14. The media of claim 13, wherein a position of each at least one APF in the identified service chain dictates where along a service function path a function associated with the at least one APF is performed.

15. The media of claim 10, wherein the APF flag is set to the first value by a classifier based on classification of the encapsulated packet as at least one of a member of a particular subset of packets, a member of a particular subset of flows, being sent during a particular time period, being related to a particular subscriber, and being related to a particular application.

16. An apparatus comprising:
   a memory element configured to store data;
   a processor operable to execute instructions associated with the data; and
   a service forwarding function ("SFF") module configured to:
      receive, at a forwarding network element in a pre-classified service path an encapsulated packet including an encapsulation header, wherein the encapsulation header includes an Analytics Proxy Function ("APF") flag, wherein the APF comprises a dormant service function; and
      upon determining that the APF flag is set to a first value;
      activate a local APF instance, wherein the activated local APF is dormant prior to activation and performs as a pass-through function when dormant, and forward the encapsulated packet to the activated local APF instance associated with the forwarding network element, wherein the encapsulated packet is processed by the activated local APF instance to replicate at least a portion of the encapsulated packet, construct a record of the encapsulated packet, or both; wherein the local APF instance is implemented as a service function anchored at the forwarding network element, wherein the activated local APF instance performs as a pass-through function after the replication, construction, or both.

17. The apparatus of claim 16, wherein the encapsulation header comprises a network services header ("NSH") including a service path header including a Service Path ID ("SPI") for identifying a service chain for the encapsulated packet and a Service Index ("SI") for identifying a service function of the identified service chain, the module further configured to:
   subsequent to the forwarding, decrement the SI; and
   forward the encapsulated packet to a next service function indicated by the SI.

18. The apparatus of claim 17, wherein the identified service chain includes a plurality of service functions and wherein at least one of the service functions included in the service chain comprises at least one APF, wherein a first local APF instance comprises an instance of the at least one APF, and wherein a position of each at least one APF in the identified service chain dictates where along a service function path a function associated with the at least one APF is performed.

19. The apparatus of claim 16, wherein the APF flag is set to the first value by a classifier based on classification of the encapsulated packet as at least one of a member of a particular subset of packets, a member of a particular subset of flows, being sent during a particular time period, being related to a particular subscriber, and being related to a particular application.

20. The method of claim 1, wherein upon determining that the APF flag is not set to the first value; the method further comprises:

omitting forwarding the encapsulated packet to the local APF instance associated with the forwarding network element.

\* \* \* \* \*